3,513,109
PROCESS FOR APPLYING CATALYTIC COATINGS
Alvin B. Stiles, Welshire, Wilmington, Del., assignor to E. I. du Pont de Nemours and Company, Wilmington, Del., a corporation of Delaware
No Drawing. Filed Apr. 19, 1967, Ser. No. 631,915
Int. Cl. B01j *11/08, 11/22*
U.S. Cl. 252—462      4 Claims

ABSTRACT OF THE DISCLOSURE

A method of applying catalytic materials to a support, particularly supports having smooth surfaces of low surface area, by slurrying a finely divided form of the catalytic material in a solution of a metal ammine, applying the slurry to the support, drying and calcining. In a preferred aspect, the catalytic material applied contains interspersants to stabilize the catalyst from crystal growth at high temperatures.

BRIEF SUMMARY OF THE INVENTION

This invention relates to processes for applying catalytic materials to supports. More particularly, this invention relates to processes for applying catalytic material to supports having smooth surfaces by the use of a slurry of the catalytic material with metal ammines.

It has been difficult to apply catalytic material to catalyst supports which have a smooth surface without the use of materails which will adversely affect the catalytic activity. This is particularly true of rugged catalyst supports which are usually very dense, non-porous and have smooth surfaces of low surface area.

Conventional processes are known in the art for improving the surface porosity or the surface area of catalyst supports such that under microscopic conditions they will appear to have an unsmooth surface. However, when the process of the invention is used, it is not necessary to use these conventional techniques. The process of the invention will work with catalytic supports having surfaces which are microscopically smooth.

I have found that if very finely divided catalytic materials are suspended or slurried with metal ammines, a relatively thick layer of this slurry can be applied or caused to adhere to the smooth surface of the support. After this coating has been dried and calcined, it is porous, strongly adherent to the support, abrasion resistant, and most importantly, it is extremely active from a catalytic standpoint.

By the use of the process of the invention, finely divided particles of the oxides, hydroxides, carbonates, chromates, chromites, cerates, vanadates, stannates, ferrites, arsonates, antimonates, uranates, tungstates, manganites, and molybdates of nickel, cobalt, manganese, silver, iron, chromium, calcium, strontium, barium, cadmium, zinc, tin, mercury, bismuth, palladium, platinum, ruthenium, uranium, arsenic, antimony, thallium, zirconium, copper, lanthanum and the rare earths; elemental platinum, palladium, ruthenium, rhodium, iridium, or osmium can be applied to supports by mixing them in a solution containing at least one ammine from the group of ammines of nickel, cobalt, copper, zinc, palladium, cadmium, barium, silver, and the like. Further, separately prepared ammines can be used, such as the ammines of platinum, iron, manganese, the rare earths and the like. However, since these ammines will at least partially decompose in an aqueous environment, these ammines should be used in an organic solvent such as methanol, acetone or ethyl acetate.

Heteropoly acids as disclosed in Turkevitch U.S. Pat. 2,886,515 can also be used as the catalytic material. Typical of these heteropoly acids are:

$H_9Al(MoO_4)_6 \cdot XH_2O$
$H_9Cr(MoO_4)_6 \cdot XH_2O$
$H_9Fe(MoO_4)_6 \cdot XH_2O$
$H_9Co(MoO_4)_6 \cdot XH_2O$
$H_9Mn(MoO_4)_6 \cdot XH_2O$
$H_9Rh(MoO_4)_6 \cdot XH_2O$
$TiO_2 \cdot 12MoO_3 \cdot 22H_2O$
$GeO_2 \cdot 12MoO_3 \cdot 32H_2O$
$V_2O_5 \cdot 8MoO_4 \cdot 5H_2O$
$(NH_4)_5H_3[H_2MoS_4]_4VS_3 \cdot 10H_2O$
$(NH_4)_4H_6[Ni(MoO_4)_6]_3 \cdot 5H_2O$
$(NH_4)_4H_6[Cu(MoO_4)_6] \cdot 5H_2O$
$(NH_4)_4H_6[Rh(MoO_4)_6] \cdot 7H_2O$
$(NH_4)_5H_2[P(V_2O_6)_6] \cdot 21H_2O$
$H_4[SiMo_{12}O_{40}] \cdot 10H_2O$
$SiO_2 \cdot 12MoO_3 \cdot 32H_2O$
$P_2O_5 \cdot 24MoO_3 \cdot 63H_2O$
$B_2O_3 \cdot 24WO_3 \cdot 63H_2O$
$I_2O_7 \cdot 12WO_3 \cdot 11H_2O$

*Note.*—(X equals 1 to 70).

The process can also be used to apply catalytic materials to porous supports; however, the real advantages of the process are realized when it is used to apply catalytic materials to smooth surfaces.

DETAILED DESCRIPTION OF THE INVENTION

The support material on which the catalytic coating is to be applied can be any type of support material, i.e., porous or not; however, the process of the invention is particularly suited for use with supports having smooth surfaces. Exemplary of useful support materials are the following: glass, metals, fused alumina, fused silica, mullite, beryl, zirconia, zircon, porcelain, dense sintered alumina, chromia, spinel, magnesia, fused magnesia, lanthanum and titania.

The process of the invention is particularly useful in applying catalytic coatings to alumina honeycombs made by the in situ oxidation of aluminum honeycomb as described in U.S. Pat. 3,255,037 to Talsma. In this process an aluminum foil honeycomb is coated with a fluxing agent, e.g., sodium silicate, and fired in an oxygen atmosphere to oxidize the aluminum to alumina. For further details on the process, reference can be made to the Talsma patent.

The size and the form of the support is immaterial and it can be orientated or unorientated, thus it can be in the form of a honeycomb or it could be in the form of pellets, granules, spheres, corrugated shapes, bars, rods, tubes, rolls, saddles, screens, beads, spirals, coils, or any of the conventional shapes of the art.

When the process of the invention is used with supports having porous structures, the process of the invention is highly effective in that it results in the coating of the entire surface of such a structure and particularly the external portions where normally, catalytic reactions take place.

The process of the invention is useful with most catalytic materials.

Exemplary of the useful catalytic materials are the oxides, hydroxides, carbonates, chromates, chromites, cerates, tungstates, manganates, vanadates, stannates, ferrites, arsonates, antimonates, uranates, and molybdates of nickel, cobalt, manganese, silver, iron, chromium, cadmium, zinc, tin, mercury, bismuth, palladium, platinum, ruthenium, uranium, arsenic, antimony, thallium, calcium, strontium, barium, zirconium, copper, lanthanum and the rare earths, elemental silver, nickel, cobalt, copper, platinum, palladium, ruthenium, rhodium, iridium, or osmium. Mixtures of these catalytic materials can also be used.

Typical catalytic materials which are suitable for use in the method of the invention include: copper chromite, calcium chromate, barium chromate, iron chromite, cobalt chromite, nickel chromite, copper manganite, calcium manganite, iron manganite, cobalt manganite, nickel manganite, calcium molybdate, barium molybdate, calcium tungstate, barium tungstate, ferrous tungstate, manganese tungstate, cobalt tungstate, nickel tungstate, cupric tungstate, calcium cerate, barium cerate, copper cerate, bismuth molybdate, antimony uranate, uranium arsonate, calcium oxide, silver oxide, cuprous oxide, barium oxide, chromic oxide, plumbic oxide, manganese oxide, cobalt oxide and nickel oxide and elemental nickel, cobalt, silver or copper.

The catalytic material used should be in a finely divided form. The crystallite size of the ultimate particle should be less than 1500 angstroms in its greatest dimension and preferably less than 100 angstroms. Such particles are most preferably in the form of unitary crystals and if in the dry form they should be pulverulent to the ultimate particles. Ideally, the form is a colloidal suspension in which the particles are all in the range mentioned, though dispersions or suspensions can be used in which there is some aggregation of particles.

The determination of crystallite size can be made by conventional X-ray analytical techniques. A suitable method is shown in X-Ray Diffraction Procedures by H. P. Klug and L. E. Alexander, published by John Wiley & Sons, New York, 1954 edition.

Instead of using just the catalytic active material, the process of the invention is also useful when this material has been aggregated with an interspersant by techniques known in the art. Thus the catalytic material in materials selected and slurried can previously be formed into aggregates in which the crystallites of the catalytic material are kept apart by a refractory material which melts above 1000° C. and which is called an interspersant.

To make these aggregates, a colloidal dispersion or a suspension of an active catalytic material as described is placed in a liquid medium, preferably water, and to this is added the interspersant. The interspersant is in solution, or in colloidal dispersion or suspension or can be formed in situ by chemical reaction between suitable reactants.

The interspersants, the chemical nature of which will be described further hereinafter, are of a size comparable to the catalytic material. Thus the crystallite size should preferably not be notably larger than 1500 angstroms and it is more preferred that the size be no greater than 500, and, still better, no greater than in the range of about 50 angstroms.

After the interspersant has been added to the catalytically active material as described, the catalyst distended with the interspersant is then dried and heated further to remove water and to decompose the catalyst, if need be, and the interspersant, if need be.

The calcination temperature should be below that at which sintering occurs and it is generally between 200° and 500° C.

After the calcining, the interspersant can be part of the catalyst, that is, it can be a solid solution with the catalytic material or it can react with the catalytic material to form materials such as a spinel. On the other hand it can be just a physical admixture.

The resulting catalytic agglomerate should have a particle size of less than 150 mesh; this can be accomplished by conventional milling techniques.

Additional details on how such an interspersant can be incorporated, or further how a second interspersant can also be used may be found in U.S. Pat. 3,317,439 and the disclosure of this patent is incorporated herein by reference.

The preparation of the slurry ordinarily begins by forming a dispersion of the catalytic material or the above described agglomerate, with a metal ammine, preferably the ammine of the same metal as the catalytic material. However, the ammine can be that of a different catalytic metal provided a catalytic composite is formed, i.e., the two materials are catalytically compatible.

Ammines are conventionally prepared by treating a solution of the nitrate, formate, acetate, chloride, iodide, sulfate, or the like, of the metal, e.g., nickel, cobalt, copper, magnesium, cadmium, silver, zinc, platinum, and palladium with a base to form the complex metalammonia compounds. Useful bases include ammonium hydroxide, ammonium carbonate, ammonium bicarbonate, and the alkyl amine complexes. The specific method used to prepare the desired ammines is not critical, and any conventional method may be used. Thus other ammines can be made in the dry state by first calcining the metal salt hydrate and subsequently passing $NH_3$ vapor over the anhydrous salt to form the ammine.

Thus useful ammines include the ammines of nickel, cobalt, manganese, silver, iron, chromium, calcium, strontium, cadmium, zinc, tin, mercury, bismuth, palladium, platinum, ruthenium, uranium, arsenic, antimony, beryllium, thallium, barium, zirconium, copper, lanthanum, and the rare earths, or mixtures thereof.

The slurry is then produced by adding the ammine and catalytic material together with rapid agitation, milling or grinding. However, in many embodiments, it may be desired to produce the ammine in situ in the slurry, and this can be accomplished by, e.g., adding the catalytic metal and an appropriate metal salt together and then adding sufficient base to produce the ammine.

The catalytic material should be at least 1% and preferably at least 3% of the slurry and can range as high as 97%.

The ammine should be at least 3% of the slurry in order to have proper adhesion to the support and can range up to as high as 75% of the slurry. Generally, the ammine will be between 20 and 40% of the slurry.

The slurry can then be applied to the support by conventional means such as spraying, dipping, immersion, or any other suitable techniques.

As previously set forth, the catalytic material in the slurry can be agglomerated with an interspersant. Useful interspersants include the previously-mentioned catalytic materials or other materials not catalytically harmful as long as the material has a melting point above 1000° C.

The interspersants are of a size comparable to the catalytic material. Thus the crystallite size should preferably not be notably larger than 1500 angstroms in its greatest dimension and it is more preferred that the size be no greater than 500 and still more preferred no greater than 50 angstroms.

Suitable interspersants include, in general, any refractory material which is or can be in the form of crystallites in the size range described. Preferred interspersants are the following: beryllium oxide, magnesium oxide, calcium oxide, zinc oxide, cadmium oxide, barium oxide, strontium oxide, aluminum oxide, lanthanum oxide, silicon oxide, titanium dioxide, zirconium oxide, hafnium oxide, chromic oxide, manganese oxide, barium titanate, zirconium silicate, magnesium aluminate, cerium oxide, calcium titanate, aluminum chromite, barium silicate, zirconium silicate, magnesium silicate, calcium silicate, strontium silicate, magnesium titanate, strontium titanate, calcium titanate, barium zirconate, magnesium zirconate, calcium zirconate, strontium zirconate, barium cerate, magnesium cerate, and calcium cerate.

With respect to the interspersant used, it is of course obvious that in some applications the condition for which the final catalyst will be used will determine which interspersants can be used. Thus, in an operation such as methane reforming where one has $CO_2$ present at high temperatures, one would not use strontium, barium or calcium because these compounds would form carbonates and spalling of the catalyst would occur.

The slurry would preferably contain at least 1% to 95% interspersant, and a preferable lower limit would be about 5%.

The slurry containing the catalytic material and the metal ammine and, optionally, the interspersant is then applied to the support. The slurry can be applied by any of the conventional means such as spraying, dipping or immersion. After the slurry has been applied to the support, which under some circumstances can be two or three different sprayings or dippings with a drying step interposed in between, the coated support is then air dried and calcined or if desired it could be calcined immediately without the intervening air-drying step. The coating thus applied can range in thickness from a monomolecular layer up to a thickness of 10.0 mils. The thickness used is not critical and depends upon the conditions of the catalytic reaction for which the catalyst is to be used. It is one of the advantages of the process of the invention that layers of thickness approaching 10 mils can be caused to adhere to the smooth surface of the support.

The temperature of the calcining operation will generally be in the range of 100 to 450° C. but can range as high as 700 to 800° C. The calcining step should be conducted at such a rate over a period of time such that spalling or explosive decrepitation are avoided, otherwise the timing is not critical.

Though not an essential feature of the process of the invention, if desired, catalytic promoters can be added to the slurry before it is applied to the support and calcined. Thus barium nitrate, calcium nitrate, chromium nitrate, and the like can be added.

After the calcining step, if necessary the conventional activating treatments can be conducted. Thus the catalyst can be reduced, oxidized, halogenated, i.e., chlorinated or brominated, sulfated, sulfited, or sulfided.

The catalyst of the present invention can be used in the same way as the prior art catalyst containing the same active catalytic materials. Specific catalysts and suggested uses will be given in the examples. Exemplary of the uses of the catalysts of the invention are the use of nickel in methane reforming and hydrogenation in general, cobalt in the hydrogenation of material such as adipontrile to hexamethylenediamine, manganese for oxidation reactions, silver for olefinic oxidations and methanol to formaldehyde, iron for the preparation of ammonia synthesis gas and the use of copper and silver for dehydrogenations.

In order that the invention may be better understood, reference should be made to the following illustrative examples. In the examples, parts refer to parts by weight unless otherwise indicated.

Example 1

Manganese nitrate, equivalent to 3 molecular weights, is dissolved in 5000 parts by weight of distilled water.

To this solution is added 200 parts by weight of chromic acid anhydride. The solution thus prepared is heated to 60° C. while being agitated. Ammonium hydroxide is then added at a rate of 10 parts by weight per minute of a 28% ammonium hydroxide solution, until a pH of 6.9 is obtained.

The resulting slurry is agitated for 60 minutes, then is filtered, and the filtered cake dried and calcined at 450° C. for 2 hours. The product obtained is the manganese chromite catalyst which is used in the subsequent description of this example.

500 parts by weight of the manganese chromite is slurried in 200 parts by weight of distilled water. There is dissolved also in this slurry 72.5 parts by weight of cobalt nitrate hexahydrate and 72.5 parts by weight of nickel nitrate hexahydrate. There is next added to this slurry ammonium hydroxide in sufficient quantity to effect the complete precipitation and subsequent resolution of both the cobalt and nickel hydroxides. The slurry thus prepared is sprayed onto porcelain rings ⅜ inch diameter, ⅜ inch long and with a ⅛ inch centered hole and is then calcined at 400° C. for 2 hours.

This catalyst is useful for the oxidation of waste gases from industrial operations to remove odors and combustible gases. It is also useful for the oxidation of noxious constituents in automotive exhaust gases; in such use solid 3/16″ x 3/10″ alumina cylinders are used.

Instead of the cobalt and nickel nitrates specified above, one can use a stoichiometric equivalent of zinc to replace both the nickel and cobalt. An active catalyst for synthesizing methanol from carbon monoxide and hydrogen is produced.

Example 2

A nickel-alumina methane conversion catalyst is prepared by dissolving the equivalent of 330 parts of elemental nickel as nickel nitrate salt in 5000 parts of distilled water. There is slurried in this solution 180 parts of alumina hydrate in finely divided form such as that designated C–730 produced by the Aluminum Company of America. The solution-slurry is heated to 80° C. and sufficient ammonium carbonate is added to the solution to raise the pH to 7.2. Thereafter the precipitate is filtered, dried and calcined for 3 hours at 800° C. to produce an alumina-nickel catalyst.

100 parts of the finely divided catalyst produced above is slurried in 300 parts by weight of distilled water in which is dissolved 60 parts by weight of elemental nickel as nickel nitrate. Sufficient ammonium hydroxide is now added to the solution-slurry to completely precipitate and then redissolve the nickel hydroxide as nickel ammine nitrate.

The slurry thus produced is used to coat ceramic structures in the form of 1 inch by 1 inch rhombohedrons having honeycomb configuration with 3/16 inch cell openings.

After coating the ceramic structures they are dried and calcined for 1 hour at 800° C. in an oxidizing atmosphere. The catalyst thus produced is effective for the conversion of hydrocarbons plus steam to carbon monoxide, carbon dioxide and hydrogen.

Instead of the nickel nitrate alone specified in the second paragraph in this example, there can be used the equivalent amount of nickel nitrate plus 2 parts of elemental palladium as palladium nitrate. The catalyst thus produced is very effective for steam hydrocarbon reforming reactions and after careful reduction, for hydrogenation of double bonds and, when moderated by partial sulfiding, for the selective hydrogenation of acetylene in the presence of ethylene.

Example 3

165 parts by weight of nickel as nickel nitrate is dissolved in 6000 parts by weight of distilled water. There is next dissolved in this same solution 300 parts by weight of chromium trioxide ($CrO_3$). The solution is heated to 65° C. and ammonium carbonate is then added to raise the pH to 7.4. The precipitate which is formed is filtered, dried and finally calcined for 2 hours at 400° C.

300 parts by weight of the nickel chromite catalyst thus produced is slurried in 400 parts by weight of distilled water in which is dissolved 60 parts by weight of elemental cobalt as cobalt nitrate. Next, sufficient anhydrous ammonia is added to the solution-slurry to raise the pH to approximately 10 where the cobalt has been precipitated and redissolved as the ammine salt. This slurry is then used to coat ceramics in the form of ½ inch by ½ inch cylinders with ¼ inch holes which are then dried and calcined at 400° C. The catalyst thus produced is effective for the purification of gas streams by the hydrogenation of carbon monoxide to methane. It is also useful for the hydrogenation of nitro groups to amines, for nitrile groups to amines, and for the hydrogenation of double bonds and the hydrogenation of benzene to cyclohexane.

Example 4

325 parts of copper as copper nitrate is dissolved in 6000 parts of distilled water. 500 parts of chromic acid anhydride ($CrO_3$) are also dissolved in the copper nitrate solution. The temperature of the solution is adjusted to 30° C., then anhydrous ammonia is added to the solution to raise the pH to 7.0±0.3 pH. After agitating for 1 hour after the completion of precipitation, the precipitate is filtered, dried and finally calcined at 425° C. to produce the catalyst which is commonly designated as copper chromite.

500 parts of the finely divided catalyst is slurried in 1000 parts of distilled water in which is dissolved 130 parts by weight of elemental copper as copper nitrate and 34 parts by weight of barium as barium nitrate. Ammonium hydroxide is now added to the solution-slurry to convert the copper nitrate and barium nitrate to the respective ammines. The resultant slurry is coated onto copper tubing in the form of a coil. The coated structure is calcined at 400° C. to effect decomposition of the ammines. The catalyst-coated coil is effective for the hydrogenolysis of esters such as methylhydroxyacetate, the glyceride esters of palmitic, stearic, oleic, or ricinoleic acids or the hydrogenation of the acids themselves such as the so-called tall oil acids to the respective alcohols. Suitable fluids can be circulated through the copper coil to maintain a relatively constant temperature for preheating the incoming reactant streams and subsequently abstracting heat of reaction.

Instead of the barium and copper nitrates specified in the example above for ammines preparation, there can be used a stoichiometric equivalent amount of cadmium nitrate to produce cadmium ammine nitrate. The slurry can be supported on a copper coil similarly and used in similar operations.

Example 5

100 parts by weight of activated alumina having a surface area of 200 square meters per gram and which will pass 100% through a 200 mesh screen is slurried in 250 parts by weight of distilled water to which is added 5 parts by weight of elemental platinum as chloroplatinic acid. Ammonium carbonate solution is then added to raise the pH to 9.5. At this point a 10% solution of hydrazine hydrate in distilled water is added in sufficient quantity to completely precipitate the platinum onto the alumina. The catalyst is then filtered, washed on the filter and finally calcined at 250° C. in a flow of air to activate the catalyst. 200 parts by weight of the thus derived catalyst is slurried in 200 parts of distilled water in which is dissolved 10 parts of palladium as palladium nitrate. Sufficient ammonium hydroxide is added to convert the palladium to palladium ammine nitrate. The slurry is then used to coat alpha-alumina in the form of honeycomb structures having ⅛ inch cells and being in the form of 1 inch cubic blocks. After calcining at 100° C. in air, the catalyst is effective for hydrogenations typical of platinum and palladium and for the oxidation of sulfur dioxide to sulfur trioxide at temperatures below 400° C. and at high space velocities.

Example 6

A silver catalyst supported on alpha-alumina is prepared by the pulverization of alpha-alumina so that it will pass 100% through 325 mesh screen. 100 parts by weight of the resultant alpha-alumina is slurried in 300 parts by weight of distilled water containing additionally 20 parts by weight of elemental silver as silver nitrate. The silver is next precipitated onto the alpha-alumina as silver carbonate using sodium carbonate as the precipitant. After precipitation is complete the precipitate is filtered and washed to remove the foreign ions. The precipitate is next dried and finally calcined at 250° C. to decompose the silver carbonate and form silver-silver oxide supported on alumina.

100 parts by weight of the catalyst is slurried in a solution comprising 500 parts by weight of distilled water, 100 parts by weight of silver as silver nitrate and 10 parts by weight of beryllium as beryllium nitrate. Anhydrous ammonia vapor is added to the slurry to convert the silver to silver ammine and the beryllium to hydroxyammine. The slurry is used to coat granules of alpha-alumina by immersing the granules in the slurry, removing excess slurry, drying and calcining the coated granules at 250° C. The coating operation is repeated three times in order to uniformly and completely coat the granules with the catalytically active material.

The catalyst thus produced is effective for the oxidation of ethylene to ethylene oxide and for the oxidation of methanol to formaldehyde. It is also effective for the dehydrogenation of isopropanol to acetone.

Example 7

A cobalt carbonate on kieselguhr catalyst is produced by dissolving 120 parts by weight of elemental cobalt as cobalt nitrate in 2000 parts by weight of distilled water. 300 parts by weight of pulverized kieselguhr is next added to the nickel nitrate solution. The slurry is now rapidly agitated and heated to 70° C. and the cobalt is precipitated as the basic carbonate by the addition of sodium carbonate slowly as a spray until a pH of 7.5 is reached. The catalyst is allowed to remain at this temperature and pH for 60 minutes, then is quickly filtered, washed to remove foreign ions and is dried.

200 parts by weight of the pulverized cobalt carbonate on kieselguhr is slurried in 800 parts of distilled water which additionally contains 60 parts of cobalt as cobalt nitrate and 10 parts of zirconium as zirconium nitrate. Anhydrous ammonia is next added to the slurry to convert the cobalt to cobalt ammine and the zirconium to a hydroxyammine. The slurry is used to coat etched stainless steel turnings. The turnings are then exposed to an atmosphere of hydrogen at 475° C. to reduce the cobalt salts to elemental cobalt. The catalyst after reduction is effective for the hydrogenation of organic nitro compounds to the corresponding amines and organic nitriles to the corresponding amines.

Instead of the cobalt there can be used a stoichiometric equivalent amount of nickel in both the preparation of the kieselguhr supported material and also in the ammine salt portion of the preparation.

Instead of the zirconium nitrate there can be used stoichiometric equivalent amounts of calcium, strontium, barium, uranium or lanthanum to produce effective catalysts. The rare earths also would be effective substitutes but when using the rare earths they must be separately converted to anhydrous salts. If the chloride, for example, is used, it must be converted to the ammine in a solid state by first dehydrating, then by passing anhydrous ammonia over it to convert it to the amine. A further change must also be made during the final slurry preparation in that instead of using water as the liquid medium one should substitute either methanol, acetone or an ester to avoid hydrolysis.

I claim:
1. A method for forming an adherent catalytic coating on a support having a smooth surface comprising applying to said support a slurry composed of (A) finely divided particles of a catalyst selected from the group consisting of (1) the oxides, hydroxides, carbonates, chromates, chromites, cerates, vanadates, stannates, ferrites, arsenites, antimonates, uranates, tungstates, manganites and molybdates of nickel, cobalt, manganese, silver, iron, chromium, calcium, cadmium, zinc, tin, mercury, bismuth, palladium, platinum, ruthenium, uranium, arsenic, antimony, thallium, strontium, barium, copper, lanthanum, the rare earths; (2) the elements of platinum, palladium, ruthenium, silver, nickel, cobalt, copper, rhodium, irid- ium or osmium; (3) and mixtures thereof in (B) a solution of at least one ammine selected from ammines of nickel, cobalt, silver, cadmium, zinc, arsenic, antimony, chromium, copper, and mixtures thereof and then drying said coating and calcining.

2. The method of claim 1 wherein said finely divided catalyst particles are aggregated with crystallites of a refractory material which melts above 1000° C. and is selected from the group consisting of beryllium oxide, magnesium oxide, calcium oxide, zinc oxide, cadmium oxide, barium oxide, strontium oxide, aluminum oxide, lanthanum oxide, silicon oxide, titanium dioxide, zirconium oxide, hafnium oxide, chromic oxide, manganese oxide, barium titanate, zirconium silicate, magnesium aluminate, cerium oxide, calcium titanate, aluminum chromite, barium silicate, zirconium silicate, magnesium silicate, calcium silicate, strontium silicate, magnesium titanate, strontium titanate, calcium titanate, barium zirconate, magnesium zirconate, calcium zirconate, strontium zirconate, barium cerate, magnesium cerate, and calcium cerate.

3. The method of claim 1 wherein the ammine is selected from the ammines of nickel or cobalt.

4. The method of claim 1 wherein the ammine is nickel ammine.

References Cited

UNITED STATES PATENTS

| | | | |
|---|---|---|---|
| 3,377,265 | 4/1968 | Caesar | 204—290 |
| 2,921,035 | 1/1960 | Houdry | 252—463 |
| 2,580,806 | 1/1952 | Malina | 252—463 |
| 3,132,111 | 5/1964 | Erickson | 252—464 |
| 3,317,439 | 5/1967 | Styles | 252—455 |
| 2,888,397 | 5/1959 | Burton | 208—138 |
| 2,760,940 | 8/1956 | Schwarzenbek | 252—466 |
| 2,689,261 | 9/1954 | Reppe | 260—497 |

PATRICK P. GARVIN, Primary Examiner

P. M. FRENCH, Assistant Examiner

U.S. Cl. X.R.

252—463, 464, 465, 466, 467, 468, 469, 470, 471, 472, 473, 474, 475, 476, 477